United States Patent [19]

Hurt

[11] E Re. 30,570

[45] Reissued Apr. 7, 1981

[54] BELT SWITCH

[75] Inventor: Frank K. Hurt, North Tazewell, Va.

[73] Assignee: Mefcor, Inc., Bluefield, Va.

[21] Appl. No.: 58,228

[22] Filed: Jul. 16, 1979

Related U.S. Patent Documents

Reissue of:

[64] Patent No.: 4,088,222
Issued: May 9, 1978
Appl. No.: 771,855
Filed: Feb. 23, 1977

[51] Int. Cl.[3] ..... H01H 3/12

[52] U.S. Cl. ..... 200/61.39; 200/61.42

[58] Field of Search ..... 198/502, 505, 571, 573, 198/575-577, 855, 856; 226/45, 100; 74/12; 340/670, 671, 675-677; 116/200, 204; 73/2, 488, 493, 495, 509, 529; 335/49, 54, 206, 207; 200/61.13, 61.39, 61.45 R, 61.42

[56] References Cited

U.S. PATENT DOCUMENTS

| | | | |
|---|---|---|---|
| 433,549 | 8/1890 | Soule | 198/502 |
| 1,973,312 | 9/1934 | Hardinge | 198/505 |
| 2,510,163 | 6/1950 | Wood | 198/502 |
| 2,589,220 | 3/1952 | Buckeridge | 198/502 |
| 2,647,966 | 8/1953 | Tornberg | 200/61.13 |
| 2,928,914 | 3/1960 | Gruber | 335/207 |
| 2,951,576 | 9/1960 | Buckeridge | 198/573 |
| 3,139,217 | 6/1964 | Mell | 198/505 |
| 3,301,974 | 1/1967 | Hancock | 200/61.13 |
| 3,487,181 | 12/1969 | Bourgault et al. | 200/61.13 |

FOREIGN PATENT DOCUMENTS

| | | | |
|---|---|---|---|
| 703082 | 1/1954 | United Kingdom | 198/856 |
| 920742 | 3/1963 | United Kingdom | 198/855 |

*Primary Examiner*—Joseph E. Valenza
*Attorney, Agent, or Firm*—Griffin, Branigan & Butler

[57] ABSTRACT

An endless-conveyor monitoring switch assembly includes an elongated frame having a shaft journaled for rotation therein and extending longitudinally therealong. A drive wheel is attached to and rotatable with the shaft at a first end of the elongated frame and a detecting switch is attached to the shaft at the opposite end of the elongated frame. A seesaw, U-shaped, mounting member is attached to the elongated frame at a point intermediate the drive wheel and the detecting switch for mounting the elongated frame on an endless-conveyor cable support. The mounting member allows the weight of the elongated frame and its attachments to pivot the frame in a seesaw manner to bring the drive wheel into contact with the endless conveyor. The detecting switch includes a conductive disc mounted on the shaft adjacent to a pendulum having permanent magnets and mercury switches mounted thereon. When the shaft rotates the disc above a predetermined speed, the permanent magnets on the pendulum cooperate with eddy currents in the disc to pivot the pendulum and thereby actuate the mercury switches.

7 Claims, 11 Drawing Figures

FIG. 2
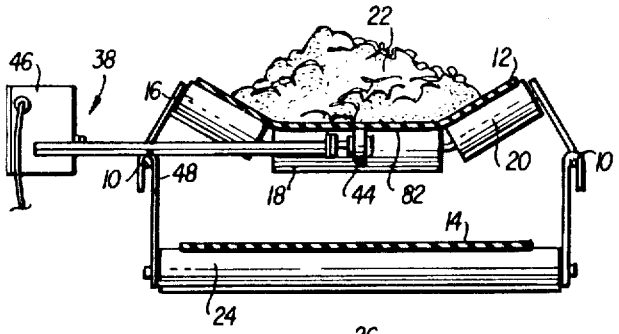
FIG. 3 (PRIOR ART)
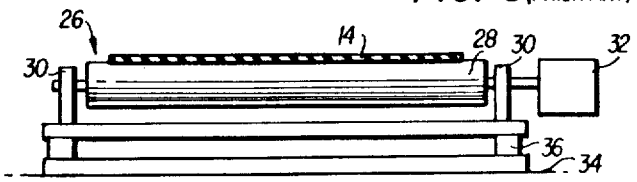
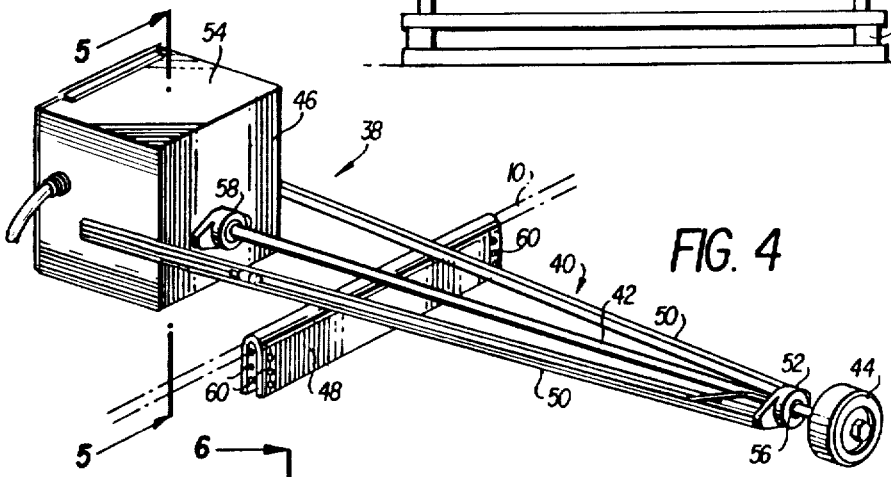
FIG. 4
FIG. 4A
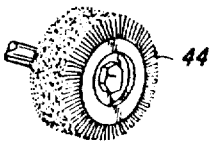
FIG. 5
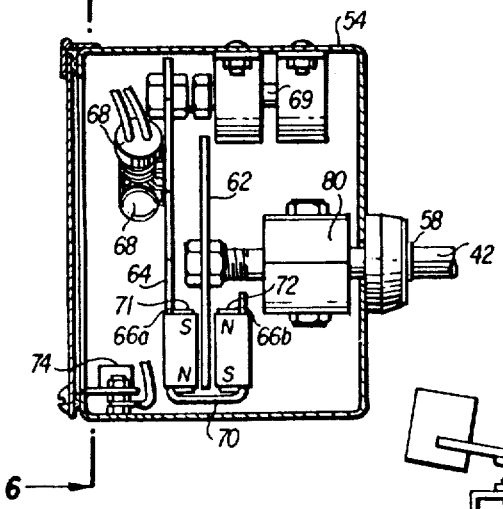
FIG. 9
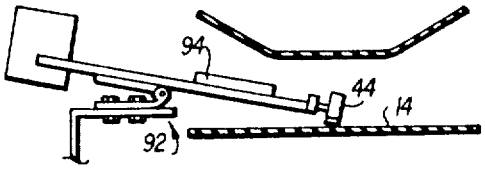

BELT SWITCH

Matter enclosed in heavy brackets [ ] appears in the original patent but forms no part of this reissue specification; matter printed in italics indicates the additions made by reissue.

BACKGROUND OF THE INVENTION

This invention relates broadly to the art of endless-conveyor-belt monitoring systems and more particularly to roller-type belt switches, and the like used to determine when belt conveyors are not moving or are moving too slowly.

Roller-type switches, and the like, are often used to monitor conveying systems for purposes of "sequencing" and determining belt slippage. In the case of sequencing, in coal mines for example, endless conveyors operate in interrelated systems in which tributary conveyors empty into main conveyors. If a main conveyor in such a system should stop due to a malfunction, for example, the tributary conveyor(s) feeding the stopped main conveyor must automatically stop. Roller switches are used to monitor the main conveyors in such systems.

With regard to slippage detection, endless conveyors, again in coal mines for example, sometimes become overloaded or unduly slippery. In these cases, the conveyor belts can begin to slip on their drive rollers and thereby cause undue heat, possibly burning the belts. Again, roller switches are used to determine when belts are not moving at a sufficient speed to thereby provide indications of slippage.

In many modern underground coal mines, conveyor belts 9 are mounted on wire ropes, or cables, 10 such as are depicted in FIGS. 1 and 2. In such cases, there is a conveying portion 12 of the belt and a return portion 14. The conveying portion 12 is carried on trough guide rollers 16, 18, and 20 which are arranged to shape the conveying portion 12 of the belt into a trough for holding coal 22. The return portion 14 of the belt 9 rides on straight guide rollers 24.

In the prior art, most roller switches have the appearance of the roller switch 26 depicted generally in FIGS. 1 and 3. This prior-art roller switch includes a heavy, full length, straight roller 28, end supports 30 at the opposite ends of the heavy roller 28, and a centrifugal switch 32 attached to the shaft of the heavy roller 28. The end supports 30 normally have bearings for supporting the heavy roller 28, the belt resting thereon, and the centrifugal switch 32.

In practice, the prior-art roller switch of FIGS. 1 and 3, to applicant's knowledge, is usually supported by ground supports 36 which are built up from the ground 34 to a proper height for causing the correct degree of loading by the belt return portion 14 on the roller 28. Although this arrangement is uncomplicated it has serveral difficulties. Firstly, the heavy roller 28 and belt return portion 14 cause an undue load on the bearings, thereby unduly reducing the lives of these bearings. Secondly, since the heavy roller 28 operates on the outside, or dirty side, of the belt return portion 14, an undue amount of water and coal dust "gob off" from the return portion 14 onto the heavy roller 28. This material causes slippage between the heavy roller 28 and the conveyor belt and also frequently jams operation of the heavy roller 28. In cold weather the problem is further complicated when the "gob off" material freezes.

Still another problem with the prior-art belt-switch system of FIGS. 1 and 3 is that the pressure of the heavy roller 28 pushing upwardly on the otherwise unloaded belt return portion 14 sometimes gets it out of alignment on the straight guide rollers 24.

It is therefore an object of this invention to provide a belt switch which not only is easy to install, but which also does not require undue loads on bearings, which operates on the clean sides of conveyor belts, and which does not tend to get conveyor belts out of alignment.

Several U.S. patents disclosing prior-art roller switches include U.S. Pat. No. 2,510,163 to Wood and 2,589,220 to Buckeridge. In both of these patents the rollers of roller switches are supported by bearings located at opposite ends of what appear to be full length, heavy, rollers. Although in both cases, the rollers operate on the clean undersides of belt conveying portions, the mounting systems for these roller switches are relatively complicated (they usually require rigid mounting structures from the ground and cannot easily be mounted on conveyor-supporting wire ropes 10, for example) and the same statements made above as to the wearing of bearings apply to the apparatus of these patents. Further, installation of roller switches between conveying and return belt portions does not eliminate the "gobbing off" problem since dust and chunks of the materials being conveyed fall from the conveying portion of the belt and collect on the relatively massive structure of the roller assembly.

Many prior-art roller-type belt switch systems employ centrifugal switches 32 as is mentioned above. Such a centrifugal switch is disclosed in U.S. Pat. No. 433,549 to Soule. However, at least one prior-art roller switch, that of Wood U.S. Pat. No. (2,510,163), utilizes a rotor being magnetically coupled to a pivotal member. When Wood's roller is driven, the rotor, apparently via magnetic flux, also rotates the pivotal member to close switch contacts. In both the centrifugal switches and in the magnetically operated switch of Wood, there are rigid contacts which physically come together. Such contacts have relatively short lives. Thus, it is an object of this invention to provide a detecting switch for a roller switch which is dependable in operation and has a relatively long life.

It is also an object of this invention to provide a detecting switch which is smooth in operation and has little wear due to friction or jerky operation.

Some newer, "solid state" belt switches do not have moving parts, but rather are coupled to monitored belts by means of magnetic and/or electrical fields. Although these systems are effective in some cases, they are often rather complicated and expensive to repair. Thus, it is another object of this invention to provide a belt switch which is relatively uncomplicated and inexpensive to repair.

SUMMARY OF THE INVENTION

According to principles of this invention, a roller switch includes an elongated frame having a shaft rotatably journaled lengthwise therein. A small detecting wheel is attached to the shaft at one end of the frame and a detecting switch is coupled to the shaft at the opposite end of the elongated frame. A seesaw mounting member is attached to the frame at a location intermediate the drive wheel and the detecting switch for pivotally mounting the elongated frame on an endless conveyor support to allow the elongated frame to pivot freely in a seesaw manner. The weight of the frame and its attachments causes pivoting of the frame to bring the drive wheel into contact with the clean underside of an endless conveyor.

In a main embodiment, the seesaw mounting member is a U-shaped channel member which is positioned crosswise of the elongated frame for receiving a conveyor-supporting wire rope on which the roller switch is mounted.

The detecting switch includes a conductive disc attached to the drive shaft and a pendulum having permanent magnets and mercury switches mounted thereon adjacent to the disc. When the disc rotates above a predetermined speed, magnetic flux of the permanent magnets cooperates with eddy currents created in the conductive disc to pivot the pendulum and thereby actuate the mercury switches.

A flywheel is also mounted on the drive shaft in order to ensure continued rotation of the drive shaft when the drive wheel momentarily "bounces" away from the conveyor belt.

BRIEF DESCRIPTION OF THE DRAWINGS

The foregoing and other objects, features, and advantanges of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

FIG. 2 is a cross-sectional view of a conveyor-belt system in which a belt switch employing principles of this invention is used;

FIG. 3 is a cross-sectional view of the prior-art roller switch system in FIG. 1 taken on line 3—3 thereof;

FIG. 4 is an isometric view of the belt switch in FIG. 2;

FIG. 4A is an isometric view of another embodiment of the drive wheel of the FIG. 4 belt switch;

FIG. 5 is a cross-sectional view taken on line 5—5 in FIG. 4;

FIG. 9 is a cross-sectional view of a conveyor-belt system in which a third-embodiment belt switch employing principles of this invention is used.

DESCRIPTION OF PREFERRED EMBODIMENTS

Figure 1:
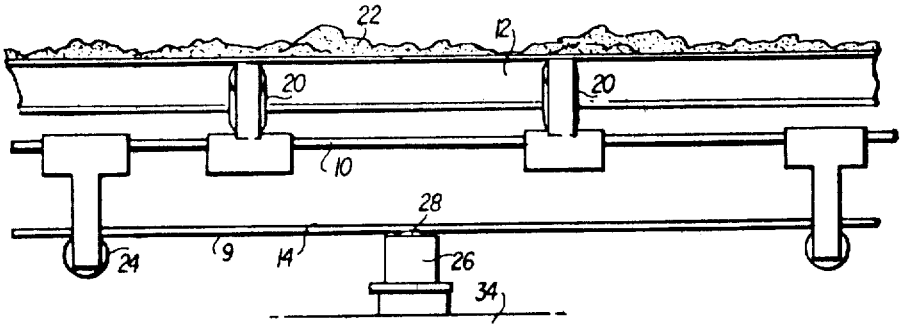
FIG. 1 (PRIOR ART)
FIG. 1 is a side view of a prior-art roller-switch system.

Referring to FIGS. 2 and 4, an endless conveyor switch assembly, or belt switch, 38 comprises basically an elongated frame 40, a driveshaft 42, a drive wheel 44, a detection switch 46, and a seesaw mounting member 48.

The elongated frame 40 is generally an A-frame formed by struts 50 merging at a bearing mount 52 at one end and being attached to a detection switch cover or box 54, at the opposite end. In the illustrated embodiment, the struts 50 have L-shaped cross-sections and are made of steel, however, other arrangements could probably be used equally as well.

The drive shaft 42 rides in a bearing 56 held by the bearing mount 52 and in a bearing 58 at the detecting switch cover 54. The drive wheel 44 is attached to, and rotatable with, the outer end of the drive shaft 42. In the illustrated embodiment, the drive wheel is constructed of a hard, but resilient, substance such as a hard rubber. However, it is also possible to make this wheel in other ways such as with radially-extending wire, or hard nylon, bristles in order to obtain additional traction on wet, oily, slimy, or muddy belts, as is depicted in FIG. 4A.

The detection switch 46 can be of various types, such as centrifugal or the like, however, in the preferred embodiment it includes a magnetically actuated pendulum switch as is described below.

The seesaw mounting member 48 is welded to the bottom sides of the struts 50 intermediate the detection switch 46 and the drive wheel 44 at a location to serve as a proper fulcrum. In this respect, the seesaw mounting member 48 basically forms a U-shaped channel which opens downwardly and which is designed to fit onto the normal conveyor-supporting wire rope 10 as is depicted in FIGS. 1, 2 and 4. When the switch assembly is thusly mounted on the wire rope 10, the elongated frame 40, with the drive wheel 44 and the detection switch 46, are free to pivot about the wire rope 10 according to weight distribution in a seesaw like manner.

FIG. 4 shows an embellishment of the seesaw mounting member 48 wherein there are pin holes 60 positioned on opposite sides of the channel for receiving pins. By choosing the holes into which pins are inserted, the height of the frame 40 above the wire rope 10 can be adjusted.

Figure 6:
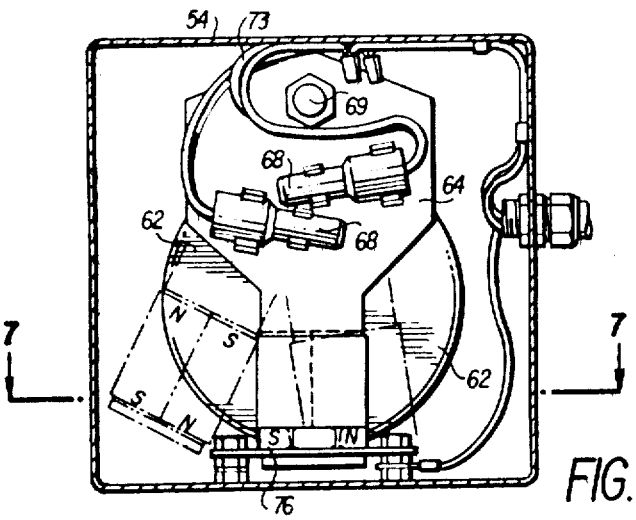
FIG. 6 is a cross-sectional view taken on line 6—6 in FIG. 5.
Figure 7:
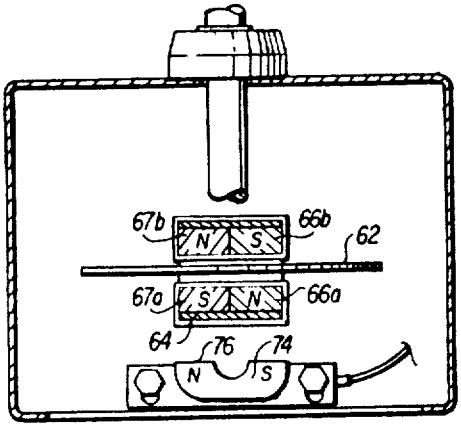
FIG. 7 is a cross-sectional view taken on line 7—7 in FIG. 6.

The detection switch 46 includes basically a conductive disc 62 (FIG. 5–7), and an inverted J-shaped pendulum 64 having permanent magnets 66a, 66b, 67a, and 67b, and mercury switches 68 attached thereto. The conductive disc 62 is attached to the drive shaft 42 to be rotatable therewith. In a preferred embodiment, the conductive disc 62 is made of aluminum, however, other materials can also be used. The J-shaped pendulum 64 hangs freely from a pin 69 which is mounted to the top of the detection switch box 54. The lower portion 70 of the J-shaped pendulum 64 extends about the conductive disc 62 and the permanent magnets 66a and 66b, and 67a and 67b, are respectively mounted on the pendulum across from one another on opposite sides of the conductive disc 62. Opposite poles are mounted opposite one another such that, for example, a south pole 71 of the permanent magnet 66a is opposite the north pole 72 of the permanent magnet 66b, etc. The mercury switches 68 are oriented such that they will be alternately activated by predetermined pivoting of the pendulum 64 about the pin 69 and they are coupled to circuitry (not shown) via lines 73 for controlling operation of the single conveyor belt being monitored or of a system of conveyor belts.

Figure 7A:
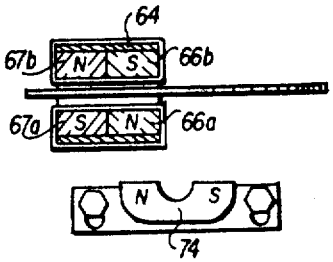
FIG. 7a is a view similar to FIG. 7 but simplified and at a different point in an operational sequence.

An embellishment of this invention is a control magnet 74 which is mounted on the floor of the detection switch box 54 so as to be adjustable toward and away from the pendulum 64. The control magnet 74 is oriented such that when the disc 62 rotates, the pendulum 64 must first overcome the attraction between the north and south poles of the control magnet 74 and the north and south poles of the pendulum magnets 66a and 67a. Once this attraction is overcome the pendulum 64 swings through the position shown in FIG. 7a where repulsion of the like poles occurs giving a "snap" action effect. The "snap action" effect helps drive the pendulum 64 beyond the control magnet 74. If the disc 62 revolves too slowly, the pendulum 64 never develops enough force to overcome the attraction between the poles of the control magnet 74 and the pendulum magnets 66a and 67a. The purpose in this construction is to provide the "snap" action to the pendulum 64 once the drive shaft 42, and its attached conductive disc 62, are rotating above a predetermined speed.

An embellishment of the detection switch 46 is that it includes a weight or flywheel 80 attached to the drive shaft 42. The flywheel 80 has a sufficiently large mass that it maintains rotation of the drive shaft 42 when the drive wheel 44 momentarily loses contact with the conveyor belt due to bouncing off seams, splices, or the like. In this respect, in the preferred embodiment, the weight distribution of the elongated frame 40 and its attachments is such that when the assembly is balanced at its seesaw mounting member 48, the detection switch 46 will move downwardly and the drive wheel 44 will move upwardly.

In operation, when it is desired to use the belt-switch assembly of this invention to monitor an endless conveyor belt it is mounted by inserting the drive-wheel end 44 of the elongated frame 40 between the conveying portion 12 of the conveyor belt and the conveyor-support wire rope 10. The frame 40 is manipulated to place the seesaw channel mounting member 48 over the wire rope 10 and the roller switch assembly is then released to pivot on the wire rope 10. The weight at the detection-switch end 46 of the elongated frame 40 overcomes the weight at the other end to move the drive wheel 44 upwardly against the bottom, or clean side, of the conveying portion 12 of the conveyor belt. In this respect, it should be noted in FIG. 2 that the drive wheel 44 strikes the bottom of the conveying portion 12 at a lower floor 82, or apex. The floor 82 is relatively broad and it is not necessary that the drive wheel 44 strike the exact apex point. This feature allows the roller switch assembly of this invention to be used with belts of various widths. For example, most underground coal mine belts are either 36 or 42-inches wide; however, some are 30-inches wide and some are 48-inches wide. By fabricating the drive wheel 44 approximately 21 inches from the seesaw mounting member 48, the roller switch assembly can be made to fit both of these size belts. This is not the case with many prior-art roller switches of the type depicted in FIG. 3 wherein the heavy rollers must be made to fit belts and their supports.

Once the roller switch assembly of this invention is seesaw mounted on the wire rope 10, the mercury switches 68 are coupled into a belt-system control network. Since this invention does not involve the control network per se, it is not thought necessary to describe the network circuitry in detail. However, it is noted that, within reason, there can be as many mercury switches mounted on the pendulum 64 as is desired, and the switches can individually be oriented to be either closed or open when the drive shaft 42 is not rotating, and to be oppositely activated when the shaft 42 is rotating. For example when the conveying portion 12 is not conveying one mercury switch 68 can be closed and another open. This indicates to the control network that this conveyor belt is not conveying and that the tributary conveyors upstream of this conveyor belt should not dump into this conveyor belt. In addition, if the control network also receives information that the conveyor belt is energized and should be conveying, then the control circuitry gives the alarm that there is slippage.

With regard to initially starting up the conveyor belt 12, an operator energizes the conveyor belt 12 and the conveyor belt starts to move slowly, thereby rotating the drive wheel 44 of the roller switch assembly. Unless there is a start-up override, which is sometimes the case, the operator must continue to depress a start-up buttom until the belt switch is energized. The drive wheel 44 drives the drive shaft 42 and the conductive disc 62. The conductive dics 62 moves through the magnetic field formed between the permanent magnets 66a and 66b mounted on the J-shaped pendulum 64. This movement through the magnetic field causes eddy currents to flow in the conductive disc 62. The eddy currents cooperate with the magnetic field to cause a torque on the pendulum 64 about the pin 69. The pendulum will, in response, thereto, tilt, thereby closing the previously open mercury switch and opening the previous closed mercury switch to inform the control network that the conveying belt is conveying. At this point the operator can discontinue depressing the start-up button.

When the control magnet 74 is adjusted to a position near the pendulum 64 its poles (FIG. 7) attract the opposite poles of the pendulum magnets 66a and 67a to prevent the pendulum 64 from rotating until a sufficient torque on the pendulum 64 is brought about by a rotation of the shaft 42 at a sufficient speed. This provides a snap action and ensures that the operator will hold his finger on the start-up button until the conveyor is fully "up to speed."

It will be appreciated by those skilled in the art that the use of a seesaw mount to allow gravity to provide the force needed to keep the drive wheel 44 in contact with the belt is highly beneficial. It allows a convenient, easy mode of installation. In addition, the bearings on this device must carry only enough weight to provide the traction necessary to drive the drive shaft 42. As was described above, the bearings on conventional roller switches carry the weights of heavy rollers and roller switches as well as the weights of sections of conveyor belts. In some cases, as is depicted in FIGS. 1 and 3, the bearings must bear portions of the loads themselves.

Further, by inserting the drive wheel 44 between the conveying and return portions of a conveyor belt, the drive wheel can operate on the "clean side" of the belt.

It should also be appreciated that the flywheel 80, or some other such weight, attached to the drive shaft 42 increases the inertia of the drive shaft 42 to eliminate false indications that the belt has stopped when the drive wheel is momentarily bounced away from the belt upon contact with a rough spot, such as a rough splice.

Still further, the mercury switches 68 of this invention wear much longer than frictional or centrifugal contact switches. The mercury switches can handle heavy loads and DC voltages much more readily than conventional contact or solid state units that cannot withstand high transiants. In this respect, most conveyor-belt control circuits use AC power. However, there are some installations that use DC power with up to 600 volts. The mercury switches are especially advantageous on those DC power applications. Further, the hermetically sealed mercury switches keep the contacts free of all foreign matter, such as coal and rock dust, for longer life of the unit as a whole.

Still another benefit of this system is that since it does not unduly load the return (empty) portion of the belt, it does not tend to move the belt out of alignment as do some prior-art roller switch arrangements. Also, the belt switch arrangement of this system can be used on various size belts much more easily than most prior-art roller switch systems.

In addition, the roller switch system described herein does not depend on a wet and irregularly shaped floor for support as do some prior-art roller systems.

Figure 8:
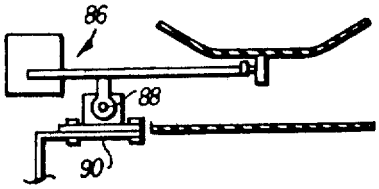
FIG. 8 is a cross-sectional view of a conveyor-belt system in which a second-embodiment belt switch employing principles of this invention is used.

While the invention has been particularly shown and described with reference to a preferred embodiment it will be understood by those skilled in the art that various changes in form and detail may be made therein without departing from the spirit and scope of the invention. For example, a seesaw roller switch 86 (FIG. 8) could be pivotally mounted on a rigid shaft 88 which is anchored on a rigid conveyor belt support 90 as is depicted in FIG. 8. Or, a hinge-type mount 92 as is depicted in FIG. 9 could also be used. FIG. 9 also suggests another embodiment of this invention wherein an extra weight 94 is added to the drive wheel end 44 of the elongated frame 40 to urge the drive wheel 44 against the top side of the return portion 14 of the conveyor belt. It would also be possible to change the direction of bias of the drive wheel 44 by changing the position of the seesaw mount. Still further, the mercury switches 68 could be replaced by other gravity operated switches.

The embodiments of the invention in which an exclusive property or privilege are claimed or defined as follows:

[1. An endless conveyor monitoring switch system to be mounted on an endless conveyor support adjacent to an endless conveyor for monitoring the movement of said endless conveyor, said switch system comprising:

an elongated frame;

a shaft journaled for rotation in said frame and extending longitudinally along said frame;

a drive wheel attached to and rotatable with said shaft said drive wheel being positioned near a first end of said elongated frame;

a detecting means attached to said shaft near the opposite end of said elongated frame for detecting when said shaft is rotating above a predetermined velocity;

a seesaw mounting means attached to said elongated frame at a location intermediate to said drive wheel and said detecting means for mounting said elongated frame on said endless conveyor support and allowing said elongated frame to pivot freely in a seesaw manner with the weight of said frame and its attachments causing pivoting of said frame to bring said drive wheel into contact with said endless conveyor, said seesaw mounting means comprising a substantially U-shaped channel member means positioned crosswise of said elongated frame for portably straddling an elongated support member extending parallel to said endless conveyor.]

[2. An endless conveyor monitoring switch system as in claim 1 wherein is further included an extra weight mounted on said shaft for increasing the inertia of the shaft tending to continue rotating said shaft when it is rotating.]

[3. An endless conveyor monitoring switch system as in claim 1 wherein said detecting means comprises:

a conductive disc attached to said shaft for rotating with said shaft;

a pendulum mounted adjacent to said conductive disc, said pendulum being weighted to a normal position but being free to pivot about an axis, said pendulum having permanent magnets attached thereto adjacent to said disc to have flux coupling with said disc; and, a gravity actuated switch means mounted on said pendulum for responding to a change in the attitude of said pendulum when said pendulum is rotated about said axis in response to rotation of said shaft and conductive disc.]

[4. An endless conveyor monitoring switch system as in claim 3 wherein said gravity actuated switch means is at least one mercury switch.]

[5. An endless conveyor monitoring switch system as in claim 1 wherein said detecting means comprises:

a conductive disc attached to said shaft for rotating with said shaft;

a pendulum mounted adjacent to said conductive disc, said pendulum being weighted to a normal position but being free to pivot about an axis, said pendulum having permanent magnets attached thereto adjacent to said disc to have flux coupling with said disc; and, a gravity actuated switch means mounted on said pendulum for responding to a change in the attitude of said pendulum when said pendulum is rotated about said axis in response to rotation of said shaft and conductive disc.]

[6. An endless conveyor monitoring switch system as in claim 5 wherein said gravity actuated switch means is at least one mercury switch.]

[7. An endless conveyor monitoring switch system as in claim 5 wherein is further included an extra weight mounted on said shaft for increasing the inertia of the shaft tending to continue rotating said shaft when it is rotating.]

[8. An endless conveyor monitoring switch system as in claim 5 wherein is further included a control magnet mounted adjacent to said pendulum for cooperating with a magnet mounted on said pendulum to prevent said pendulum from pivoting to actuate said switch means until said shaft is rotating above a predetermined speed.]

9. A rotary switch for detecting the rotation of a shaft above a predetermined speed comprising:

a conductive disc attached to said shaft for rotating with said shaft;

a pendulum mounted adjacent to said conductive disc, said pendulum being weighted to a normal position but being free to rotate about an axis, said pendulum having permanent magnets attached thereto adjacent to said disc having flux coupling with said disc; and, a gravity actuated switch means mounted on said pendulum for responding to a change in the attitude of the pendulum when said pendulum is rotated about said axis in response to rotation of said shaft and conductive disc.

10. A rotary switch as in claim 9 wherein said gravity actuated switch means is at least one mercury switch.

11. A rotary switch as in claim 9 wherein said conductive disc is of aluminum.

12. A rotary switch as in claim 11 wherein is further included an extra weight mounted on said shaft for increasing the inertia of the shaft tending to continue rotating said shaft when it is rotating.

[13. A rotary switch as in claim 9 wherein is further included an extra weight mounted on said shaft for increasing the inertia of the shaft tending to continue rotating said shaft when it is rotating.]

14. A rotary switch as in claim 9 wherein said pendulum has a J-shape so as to extend on both sides of said conductive disc and wherein there are at least two permanent magnets attached to said J-shaped pendulum, the magnets being opposite one another on opposite sides of the conductive disc.

15. A rotary switch as in claim 14 wherein said gravity actuated switch means is a mercury switch.

16. A rotary switch as in claim 9 wherein is further included a control magnet mounted adjacent to said pendulum for cooperating with a magnet mounted on said pendulum to prevent said pendulum from pivoting to actuate said switch means until said shaft is rotating above a predetermined speed.

[17. An endless conveyor energy take-off system to be mounted on an endless conveyor support adjacent to an endless conveyor for taking energy from said endless conveyor, said power take-off system comprising:

an elongated frame;

a shaft journaled for rotation in said frame and extending longitudinally along said frame;

a drive wheel attached to and rotatable with said shaft, said drive wheel being positioned near a first end of said elongated frame;

an energy utilization means attached to said shaft near the opposite end of said elongated frame for utilizing the rotary energy of said shaft;

a seesaw mounting means attached to said elongated frame at a location intermediate said drive wheel and said energy converting means for mounting said elongated frame on said endless conveyor support and allowing said elongated frame to pivot freely in a seesaw manner with the weight of said frame and its attachments causing pivoting of said frame to bring said drive wheel into contact with said endless conveyor, said seesaw mounting means comprising a substantially U-shaped channel member means positioned crosswise of said elongated frame for portably straddling an elongated support member extending parallel to said endless conveyor.]

[18. An endless conveyor energy take-off system as in claim 17 wherein said drive wheel is constructed of radially-extending bristles.]

[19. An endless conveyor energy take-off system as in claim 17 wherein said U-shaped channel member has a mouth opening at a 90° angle to said elongated frame and is adapted to be mounted on a rope-like support of said conveyor.]

[20. An endless conveyor take-off system as in claim 17 wherein is further included an extra weight mounted on said shaft for increasing the inertia of the shaft tending to continue rotating said shaft when it is rotating.]

[21. An endless conveyor monitoring switch system as in claim 1 wherein said drive wheel is constructed of radially-extending bristles.]

[22. An endless conveyor monitoring switch system to be mounted on a rope-like member of an endless conveyor support, said rope-like member being positioned adjacent to, and extending parallel with, an endless conveyor for monitoring the movement of said endless conveyor, said switch comprising:

an elongated frame;

a shaft journaled for rotation in said frame and extending longitudinally along said frame;

a drive wheel attached to and rotatable with said shaft, said drive wheel being positioned near a first end of said elongated frame;

a detecting means attached to said shaft at a position along said elongated frame spaced from said drive wheel for detecting when said shaft is rotating above a predetermined velocity;

a pivotal mounting means attached to said elongated frame for mounting said elongated frame on said rope-like member running parallel to said endless conveyor for allowing said elongated frame to pivot freely about said rope-like member with the weight of said frame and its attachments causing pivoting of said frame to bring said drive wheel into continuous contact with said endless conveyor.]

[23. An endless conveyor monitoring switch system as in claim 22 wherein said mounting defines an open-sided channel-shaped member positioned crosswise of said elongated frame for straddling said rope-like member running parallel with said elongated conveyor.]

[24. An endless conveyor monitoring switch system as in claim 22 wherein is further included an extra weight mounted on said shaft for increasing the inertia of the shaft tending to continue rotating said shaft when it is rotating.]

[25. An endless conveyor monitoring switch system as in claim 22 wherein said drive wheel is constructed of radially-extending bristles.]

[26. An endless conveyor energy take off system to be mounted on a rope-like member of an endless conveyor support adjacent to an endless conveyor for taking energy from said endless conveyor, said power take-off system comprising:

an elongated frame;

a shaft journaled for rotation in said frame and extending longitudinally along said frame;

a drive wheel attached to and rotatable with said shaft, said drive wheel being positioned near a first end of said elongated frame;

an energy utilization means attached to said shaft and mounted on said elongated frame for utilizing the rotary energy of said shaft;

a pivotal mounting means attached to said elongated frame for mounting said elongated frame on said rope-like member running parallel to said endless conveyor for allowing said elongated frame to pivot freely about said rope-like member with the weight of said frame and its attachments causing pivoting of said frame to bring said drive wheel into continuous contact with said endless conveyor.]

[27. An endless conveyor energy take-off system as in claim 26 wherein said mounting means defines an open-sided channel-shaped member positioned crosswise of said elongated frame for straddling said rope-like member running parallel with said elongated conveyor.]

[28. An endless conveyor energy take-off system as in claim 26 wherein is further included an extra weight mounted on said shaft for increasing the inertia of the shaft tending to continue rotating said shaft when it is rotating.]

[29. An endless conveyor energy take-off system as in claim 26 wherein said drive wheel is constructed of radially-extending bristles.]

* * * * *